United States Patent [19]

Shannon

[11] Patent Number: 4,529,778

[45] Date of Patent: Jul. 16, 1985

[54] PREPARATION OF MODIFIED AROMATIC MOIETY-CONTAINING POLYMERS

[75] Inventor: Mark L. Shannon, Ponca City, Okla.

[73] Assignee: Conoco Inc., Ponca City, Okla.

[21] Appl. No.: 534,855

[22] Filed: Sep. 22, 1983

Related U.S. Application Data

[62] Division of Ser. No. 329,790, Dec. 11, 1981, Pat. No. 4,424,308.

[51] Int. Cl.³ .............................................. C08F 8/00
[52] U.S. Cl. .................................... 525/196; 525/132; 525/146; 525/150; 525/151; 525/189; 525/240; 525/241; 525/260; 525/263; 525/288; 525/292; 525/337
[58] Field of Search ................. 525/196, 14; 4/424, 4/308, 132, 146, 150, 337, 240, 241, 260, 263, 151, 189, 288, 292

[56] References Cited

U.S. PATENT DOCUMENTS

| | | | |
|---|---|---|---|
| 3,665,058 | 5/1972 | Snodgrass et al. | 525/240 |
| 3,894,119 | 7/1975 | Forbes et al. | 525/196 |
| 4,058,658 | 11/1977 | Morgan | 525/232 |
| 4,107,122 | 8/1978 | Morgan | 525/232 |
| 4,252,916 | 2/1981 | Mark | 525/146 |
| 4,424,308 | 3/1984 | Shannon | 525/196 |

FOREIGN PATENT DOCUMENTS 52-78098  1/1977  Japan .................................. 525/196

*Primary Examiner*—Jacob Ziegler
*Attorney, Agent, or Firm*—Cortlan R. Schupbach

[57] ABSTRACT

A process for preparing aromatic-moiety-containing polymers having modified physical properties is disclosed. Briefly, the process comprises reacting in the presence of a Friedel-Crafts catalyst: (a) a suitable aromatic-moiety containing polymer resin and (b) a homopolymer of ω-halo-α-olefins, or co- or terpolymer of ω-halo-α-olefins with other α-olefins and/or ethylene.

8 Claims, No Drawings

PREPARATION OF MODIFIED AROMATIC MOIETY-CONTAINING POLYMERS

This invention is a divisional, filed 12/11/81 of application Ser. No. 329,790, U.S. Pat. No. 4,424,308.

The invention is in the field of processes for preparing aromatic-moiety-containing polymers having modified physical properties.

GENERAL BACKGROUND

Polymers containing aromatic moieties or aromatic centers are well-known. These polymers have well-defined properties such as flexibility, tear strength, and hardness. Examples of these types of polymers include polystyrene, polycarbonates and polyphenylene oxides.

In many instances it is desirable to modify the physical properties of the aforementioned polymers. One means of doing this heretofore has been to physically blend another material (a modifying agent) with the aromatic polymer.

I have discovered another means of modifying the aromatic polymers so that they have different properties. This means will be described in the summary of my invention.

BRIEF SUMMARY OF THE INVENTION

Briefly stated, the present invention is directed to a process for preparing aromatic-moiety-containing polymers having modified physical properties, said process comprising reacting in the presence of an effective amount of a Friedel-Crafts catalyst at temperatures of from about 0° C. to about 200° C. and for an effective length of time:
  (a) a polymer selected from the group consisting of
    (i) homopolymers of ω-halo-α-olefins containing 3 to 24 carbon atoms.
    (ii) copolymers or terpolymers of ω-halo-alpha-olefins containing 3 to 24 carbon atoms with ethylene or α-olefins containing 3 to 24 carbon atoms, and
    (iii) mixtures of (i) and (ii), and
  (b) at least a stoichiometric amount, based on the halogen present in (a), of a material selected from the group consisting of
    (i) a polymer containing an aromatic moiety,
    (ii) a monomer capable of forming an aromatic-moiety-containing polymer, or
    (iii) mixtures of (i) and (ii)
said process being characterized further in that when the reaction admixture contains a monomer capable of forming an aromatic-moiety-containing polymer the reaction admixture is subjected to a polymerization step.

In one embodiment the invention comprises reacting in the presence of an effective amount of a Friedel-Crafts catalyst at temperatures of from about 0° C. to about 200° C. and for an effective length of time:
  (a) a polymer selected from the group consisting of
    (i) homopolymers of ω-halo-α-olefins containing 3 to 24 carbon atoms,
    (ii) copolymers or terpolymers of ω-halo-α-olefins containing 3 to 24 carbon atoms with ethylene or α-olefins containing 3 to 24 carbon atoms, and
    (iii) mixtures of (i) and (ii), and
  (b) at least an equal molecular amount, based on the halogen present in (a), of a polymer containing an aromatic moiety.

In another embodiment the invention comprises
(A) reacting in the presence of an effective amount of a Friedel-Crafts catalyst at temperatures of from about 0° C. to about 200° C. and for an effective length of time:
  (a) a polymer selected from the group consisting of
    (i) homopolymers of ω-halo-α-olefins containing 3 to 24 carbon atoms,
    (ii) copolymer or terpolymers of ω-halo-αolefins containing 3 to 24 carbon atoms with ethylene or α-olefins containing 3 to 24 carbon atoms, and
    (iii) mixtures of (i) and (ii), and
  (b) at least an equal molecular amount, based on the halogen present in (a), of a monomer capable of forming an aromatic moiety containing polymer, and
polymerizing the product of step A using a polymerization catalyst under polymerization conditions.

In still another embodiment the invention comprises:
(A) reacting in the presence of an effective amount of a Friedel-Crafts at temperatures of from about 0° C. to about 200° C. and for an effective length of time:
  (a) a polymer selected from the group consisting of
    (i) homopolymers of ω-halo-α-olefins containing 3 to 24 carbon atoms,
    (ii) copolymers of terepolymers of ω-halo-α-olefins containing 3 to 24 carbon atoms with ethylene or α-olefins containing 3 to 24 carbon atoms, and
    (iii) mixtures of (i) and (ii), and
  (b) at least an equal molecular amount, based on the halogen present in (a), of mixtures of
    (i) a polymer containing an aromatic moiety, and
    (ii) a monomer capable of forming an aromatic moiety containing polymer
(B) polymerizing the product of step A using a polymerization catalyst under polymerization conditions.

The polymer products of my invention do not contain a significant amount of halogen. More specifically, the amount of halogen, present as organo-halogen compounds, is essentially nil. The amount of inorganic halogen is less than 0.1%.

DETAILED DESCRIPTION

While the invention will be illustrated using polymers and monomers of mononuclear aromatic compounds it is to be understood that the invention is not limited thereto. The invention is useful for polymers and monomers of polynuclear aromatic compounds, particularly those containing up to three rings. Because of availability, the polymers and monomers of mononuclear aromatic compounds are preferred.

Examples of suitable aromatic-moiety-containing polymers include polycarbonates, which typically have the structure

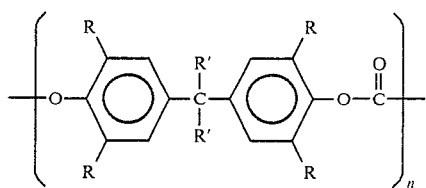

wherein

R is H or a $C_1$–$C_5$ alkyl group

R' is a $C_1$–$C_5$ alkyl group, preferably a methyl group, and n is a positive integer Polyphenylene oxides, which typically have the structure

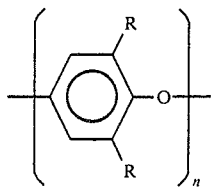

wherein

R is a $C_1$–$C_5$ alkyl group and n is a positive integer

Polyphenylene sulfides, which typically have the structure

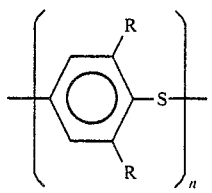

wherein R is a $C_1$–$C_5$ alkyl group and n is a positive integer

Polymers of styrene which are represented by the structure

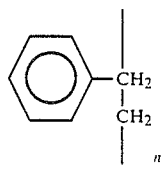

wherein n is a positive integer.

Representative but non-exhaustive examples of aromatic containing monomers are styrene, 2,6-xylenol, 2,6-dialkylphenyl, wherein each alkyl group can contain, independently, from 1 to 5 carbon atoms, and bisphenols of the general formula

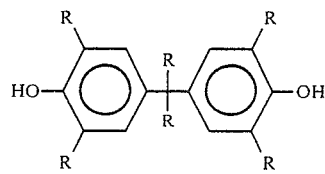

wherein each R group is, independently, hydrogen and alkyl groups containing from 1 to 5 carbon atoms, and styrene derivatives having a general formula selected from the group consisting of

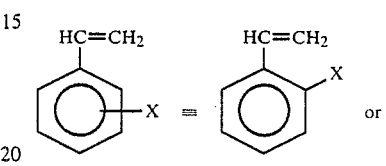

wherein each R group independently contains from 1 to 5 carbon atoms, and X is $NH_2$ or $NO_2$, and 4-halo-2,6-dialkyl thiophenols of the general formula

wherein the halogen is selected from the group consisting of chlorine, bromine or iodine, and each R group is, independently, alkyl groups containing from 1 to 5 carbon atoms.

The second essential material used in the process of my invention is a polymer selected from one of the following groups:

(a) homopolymers of ω-halo-α-olefins containing 3 to 24 carbon atoms, preferably 5 to 12 carbon atoms;

(b) copolymers or terpolymers of ω-halo α-olefins containing 3 to 24 carbon atoms, preferably 5 to 12 carbon atoms with ethylene or α-olefins containing 3 to 24 carbon atoms, preferably 5 to 12 carbon atoms; and (c) mixtures of (a) and (b).

The term "halo" as used herein refers to halogens having atomic numbers of 17 through 53, that is chlorine, bromine or iodine.

In order to avoid any ambiguity, the term alkyl as used herein refers to saturated hydrocarbon chains.

Examples of suitable ω-halo-α-olefins for use in preparing the hompolymers, copolymers or terpolymers include 6-chloro-1-hexane, 8-bromo-1-octene, 10-iodo-1-decene, 12-chloro-1-dodecene and 18-bromo-1-octadecene.

Copolymers of the ω-halo-α-olefin and ethylene or α-olefins are represented by the following formula:

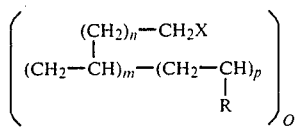

where
X = Cl, Br, or I
n = 0 to 22
R = H or $C_{12}C_{20}$ alkyl
m, p, o are positive integers The amounts of polymers or monomers of aromatic-moiety-containing materials is at least a stoichiometric amount based on the halogen present in the ω-halo-α-olefin containing polymer or copolymer.

The two materials are reacted using a suitable Friedel-Crafts catalyst. The term Friedel-Crafts catalyst is believed to be well understood in the art and refers in general to material such as aluminum halides, boron trifluoride, ferric chloride, boron trifluoride-phosphoric acid complex, antimony chlorides, stannic chloride, zinc chloride and mercuric chloride. Due to cost and ease of handling, aluminum chloride and $BF_3 \cdot Et_2O$ are the preferred catalysts.

Knowing that a Friedel-Crafts catalyst is used, any person skilled in the art can readily determine the effective amount. However, in order to provide a more specific teaching the following ranges will be given. Based on halogen present in the polymer suitable and preferred amounts of Friedel-Crafts catalyst are:

| Parts Catalyst/Part Halogen | |
| --- | --- |
| Suitable | Preferred |
| 0.01–10 | 0.1–2 |

In some instances it is desirable to use a diluent for conducting the reaction. Suitable diluents are dry, organic liquids which essentially do not contain any atmospheric oxygen. Examples of suitable hydrocarbon diluents include hexane, cyclohexane, toluene, xylene, benzene, kerosene, and a material referred to as LPA (linear polynuclear aromatic). Examples of suitable non-hydrocarbon diluents include ether, N,N-dimethyl formamide, tetrahydrofuran, acetone, and methylene chloride.

When used the amount of diluent is about 1 to about 100 parts per part total polymer by weight.

The reaction is conducted using the following conditions:

|  | Suitable | Preferred |
| --- | --- | --- |
| Temperature, °C. | 0–250 | 25–140 |
| Pressure, atmosphere | 1–7 | 1–2 |
| Time, Hours | 0.25–15 | 0.5–5 |

After completion the product is recovered using known, conventional techniques. For example, the catalyst is neutralized and/or removed. The product is washed with a suitable solvent (water or organic) and then dried to remove solvent.

As stated earlier when one of the reactants is a monomer capable of forming an aromatic moiety containing polymer, the reaction product is subjected to a polymerization step. Conventional polymerization processes can be used, with solution and suspension polymerization processes being particularly suitable.

Solution and suspension polymerization procedures are well-known in the art. Any person skilled in the art, without undue experimentation, can determine the procedure for polymerizing the reaction product.

Representative but non-exhaustive examples of such polymerization methods are polymerization of styrene by the use of radical initiators such as 2,2'-azobis-[isobutyronitrile], and bisphenols such as "Bisphenol A" by the addition of a base as represented by pyridine and phosgene comonomer. 2,6-dialkylphenols such as 2,6-xylenol can be polymerized by bubbling oxygen through a dispersion of these materials in the presence of a $Cu(I)(NR_3)_n$ type catalyst. 4-halo-2,6-dialkyl thiophenols can be polymerized by forming a sodium or potassium salt of these materials and carrying out a condensation reaction as is well known to those skilled in this art. Details of such polymerization procedures can be found in *Polymer Chemistry; An Introduction;* Stevens, M. P.; Addison-Wesley Publishing Co.; Mass (1975) and references contained therein.

Because of their physical properties the polymers of my invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high impact strength is required. They can be used to prepare molded, calendered, or extruded articles and can be applied to a broad spedtrum of uses in the form of sheets, rods, tapes, etc. The compositions may also be mixed with various modifying agents such as dyes, pigments, stabilizers, plasticizers, flame retardants, etc.

In order to illustrate the nature of the present invention still more clearly the following examples will be given. It is to be understood, however, that the invention is not to be limited to the specific conditions or details set forth in these examples except insofar as such limitations are specified in the appended claims.

EXAMPLE 1

A 1 liter four neck flask equipped with overhead mechanical stirrer, reflux condensor (w/argon inlet), and two 500 ml addition funnels is flushed with argon and 1 g of $BF_3 \cdot Et_2O$ and 80 ml of tetrahydrofuran (THF) are added. To one addition funnel is added a solution of 5 g of poly[1-octene]co[8-chloro-1-octene] (20% 8-chloro-1-octene) in 150 ml of LPA. To the other addition funnel is added a solution of 20 g of poly-phenylene oxide (PPO) dissolved in 170 ml of THF. At room temperature, and while stirring 20 ml of the PPO in THF solution is added to the reaction mixture and then the addition rates of both reagents are adjusted to be equivalent.

The reaction solution is heated to 65° C. and left to reflux for 10 hours. At the end of this period, the reaction solution is poured into ice cold dilute aqueous HCl and the precipitated polymer is filtered.

The filtered polymer is placed in a blender and washed twice with a water/isopropanol solution and vigorous stirring. The solids are filtered and air dried, then placed in a vacuum oven to dry overnight.

EXAMPLE 2

A 1 liter 3-necked flask, equipped as in Example 1, flushed with argon and 1 g of $AlCl_3$ in 50 ml of cyclohexane is added. To one of the addition funnels is added a solution of 5 g of poly[10-bromo-1-decene] in 250 ml of LPA. To the second is added a solution of 30 g of polystyrene in a mixture of 50 ml benzene and 100 ml cyclohexane. The polystyrene solution is added to the reaction mixture, and then the LPA solution of the poly[10-bromo-1-decene] is added over 3 hours. The reaction solution is refluxed as in Example 1, and the polymer is worked up as in Example 1 except that the quenched mixture is filtered, the filtrate phases are separated, and the organic solvents stripped. The combined solid precipitates are then washed once with a 50/50 toluene/isopropanol mixture in the blender, followed by treatment as in Example 1.

EXAMPLE 3

The same apparatus and procedure as in Example 2 is used except that the benzene solvent is replaced by 20 ml of styrene monomer in 30 ml additional cyclohexane. After treatment as in Example 2, the polymer is placed in a 500 ml flask containing 20 ml of styrene monomer in 100 ml of toluene and 0.25 g of 2,2'-azobis-[isobutyronitrile] (AIBN) is added, after the polymer has swollen and dissolved, to initiate polymerization. After two hours, the polymer solution is poured into 200 ml of isopropanol and 1×200 ml of methanol. The polymer is filtered, air dried, and placed in a vacuum oven to dry overnight.

EXAMPLE 4

To the apparatus described in Example 1 a solution of 30 g of 2,6-xylenol dissolved in 250 ml of THF and 2 g of $AlCl_3$ are added. The reaction mixture is cooled to 0° C. and 5 g of poly[1-decene]co[8-chloro-1-octene] (30% 8-chloro-1-octene) dissolved in 250 ml of LPA is added over 3 hours. The mixture is stirred for 1 hour and then quenched as before with ice cold dilute HCl. The polymer is then collected, washed and dried as above. The dried polymer is placed in a 500 ml flask and is dissolved in toluene; 10 g of 2,6-xylenol is added and the polymerization is conducted as in Example 3. The resulting polymer is treated as in Example 3.

Thus having described the invention in detail, it will be understood by those skilled in the art that certain variations and modifications may be made without departing from the spirit and scope of the invention as defined herein and in the appended claims.

I claim:

1. A process for preparing a polymer resin containing an aromatic moiety, said process comprising reacting in the presence of an effective amount of a Friedel/Crafts catalyst as temperature of from about 0° C. to about 200° C. and for from about 0.25 to about 15 hours:
    (a) a polymer selected from the group consisting of
        (i) homopolymers of ω-halo-α-olefins containing 3 to 24 carbon atoms,
        (ii) copolymers or terpolymers of ω-halo-α-olefins containing 3 to 24 carbon atoms with ethylene or α-olefins containing 3 to 24 carbon atoms, and
        (iii) mixtures of (i) and (ii), and
    (b) at least a stoichiometric amount, based on the halogen present in (a), of
        (i) a monomer capable of forming an aromatic moiety containing polymer or
        (ii) mixtures of (i) and a polymer containing an aromatic moiety.

2. The process of claim 1 wherein the amount of Friedel/Crafts catalyst is about 0.01 to 10 parts by weight based on the halogen in the polymer.

3. The process of claim 2 wherein the reaction using the Friedel/Crafts catalyst is conducted under the following conditions
    Temperature, °C.: 0–250
    Pressure, atmospheres: 1–7
    Time, hours: 0.25–15.

4. The process of claim 3 wherein the polymer containing an aromatic moiety is selected from the group consisting of polycarbonates, polyphenylene oxides, polyphenylene sulfides, and polymers of styrene.

5. The process of claim 4 wherein the monomer capable of forming an aromatic-moiety-containing polymer is a monomer capable of forming a polymer selected from the group consisting of polycarbonate, polyphenylene oxides, polyphenylene sulfides and polymers of styrene.

6. The process of claim 5 wherein the Friedel/Crafts catalyst is selected from the group consisting of aluminum chloride and boron trifluoride.

7. The process of claim 6 wherein the monomer capable of forming an aromatic-moiety-containing polymer is a monomer capable of forming a polymer selected from the group consisting of polycarbonate, polyphenylene oxides, polyphenylene sulfides and polymers of styrene.

8. The process of claim 1 wherein additional aromatic moiety-containing monomer or mixtures of aromatic moiety-containing monomers capable of further polymerization are added to the reaction product of (a) and (b), contacted with free radical polymerization catalyst, and further polymerization is carried out.

* * * * *